United States Patent [19]

Waltert

[11] Patent Number: 4,867,384
[45] Date of Patent: Sep. 19, 1989

[54] METHOD AND APPARATUS FOR RECOVERING GLASS FROM OLD GLASS

[75] Inventor: Erich Waltert, Erlenbach, Fed. Rep. of Germany

[73] Assignee: Firma Sorg GmbH & Co. KG., Lohr am Main, Fed. Rep. of Germany

[21] Appl. No.: 166,865

[22] Filed: Mar. 11, 1988

[30] Foreign Application Priority Data

Mar. 20, 1987 [DE] Fed. Rep. of Germany ....... 3709179

[51] Int. Cl.⁴ .............................................. B02C 19/12
[52] U.S. Cl. ........................................ 241/24; 241/77; 241/79.1; 241/81; 241/99
[58] Field of Search .................... 241/99, 24, DIG. 38, 241/79.1, 81, 76, 77, 79

[56] References Cited

U.S. PATENT DOCUMENTS 3,970,254  7/1976  Marsh .................... 241/DIG. 38 X
4,065,282 12/1977  Morey ............................. 241/24 X
4,583,695  4/1986  Genestie ................ 241/DIG. 38 X Primary Examiner—Mark Rosenbaum
Attorney, Agent, or Firm—Felfe & Lynch

[57] ABSTRACT

Method and apparatus for recovering glass from old glass by continuously feeding the old glass onto an open, continuously running conveyor system by segregating nonglass impurities and by mechanically crushing old glass in a breaking apparatus. To facilitate visual inspection and concentrating the size range of the shards, a sorting of the old glass into two fractions of different piece sizes is performed in a separating apparatus prior to the manual sorting and before crushing. Exclusively the old glass of the at least one coarser fraction ("coarse glass") is fed, after the segregation of at least a portion of the nonglass impurities, to the breaking apparatus. Then the old glass of this fraction, crushed to the desired shard size, is freed of remaining impurities and finally fed to a place of storage for good glass. After the segregation of at least a portion of the nonglass impurities, the old glass of the at least one finer fraction ("fine glass"), is fed without additional breaking, to a mechanical separating apparatus for the segregating of remaining metallic impurities and finally to a place of storage for good glass.

18 Claims, 3 Drawing Sheets

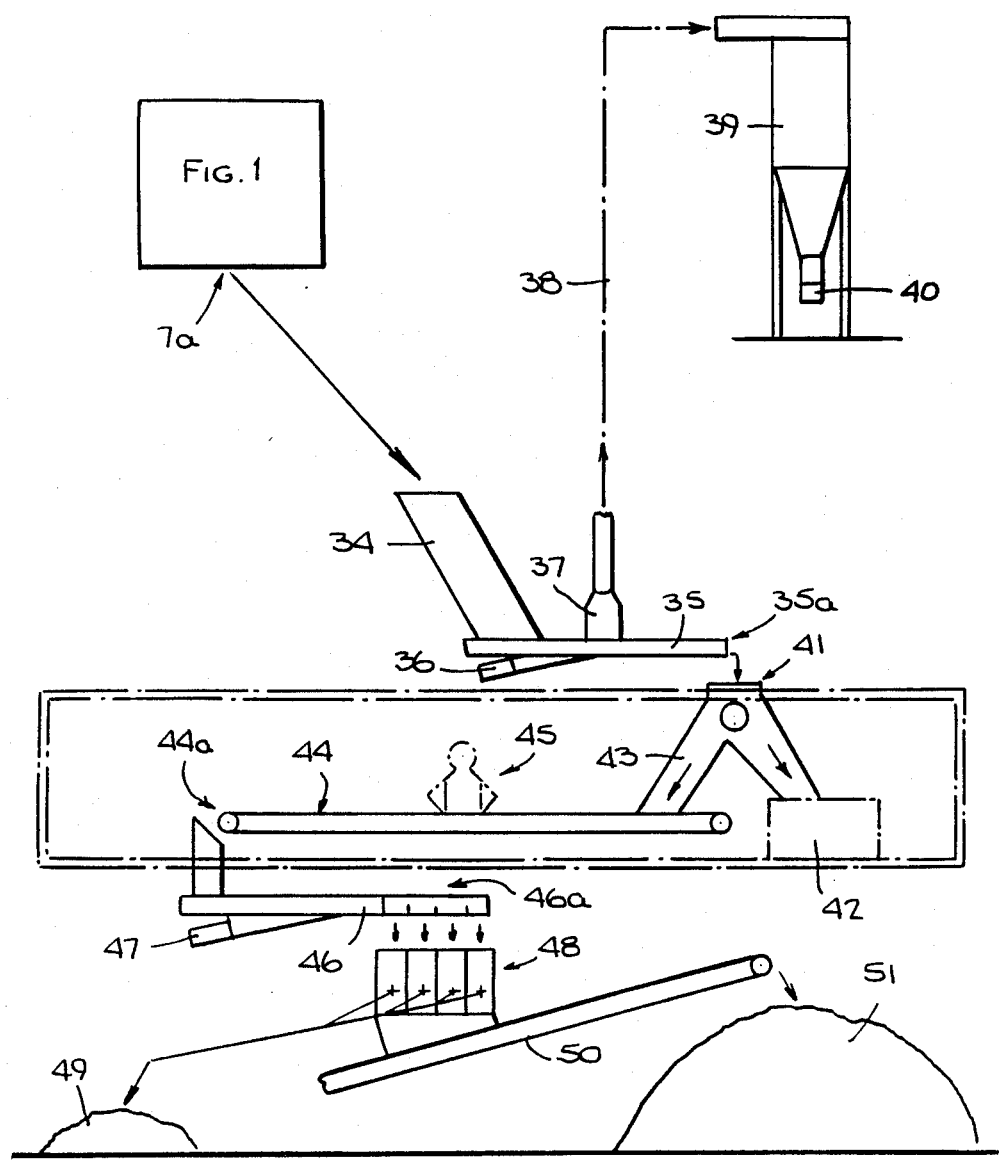

METHOD AND APPARATUS FOR RECOVERING GLASS FROM OLD GLASS

BACKGROUND OF THE INVENTION

The invention relates to a method for recovering glass from old glass by the continuous feeding of the glass scrap in the outspread state onto an open, continuously running conveyor system, by manual and mechanical sorting out of nonglass impurities such as iron and nonferrous metals as well as nonmetallic contaminants, by mechanical crushing of scrap glass in a crushing apparatus and, if desired, sorting by shard size.

The product of the method, a mass of shards within a certain shard-size range, serves later as cullet for glass melting furnaces for the production of new glass products.

The recycling of glass has gained increasing importance in recent years. The collection of old glass has become common practice everywhere since it was recognized that old glass is to be considered not only as waste but chiefly also as a raw material for the production of new glass. It is a problem that nonglass components, including metal bottle caps or parts of closures and ceramic stoppers, as well as organic impurities including pieces of plastic, labels, pieces of wood, stones and foreign matter of all kinds arbitrarily thrown into the scrap glass containers. If glass scrap only of one particular color is needed, glass of different color must be considered as nonglass components which have to be removed together with the other undesirable components if it is to be at all possible to produce new glass with the desired qualities.

Glass scrap is delivered, as a rule, in the form of a mixture of widely varying sizes. The sizes of the pieces range from small fragments through larger chunks such as bottle bottoms, all the way to whole bottles. Particularly undesirable are bottles of a certain type in which a stopper consisting of ceramic is attached to the bottle neck by a steel wire clamping mechanism. The stopper parts in this case are very difficult to remove from the mixed shards.

In one known method of the kind described in the beginning the shard mixture delivered is spread out by a feeder chute onto a conveyor system in the form of a conveyor belt, and fed first to a magnetic separator and then to a visual inspection station in which personnel watch over the movement of the entire shard mixture and sort out by hand any impurities as well as glass pieces of the wrong color. This operation is not only very fatiguing and in the course of time leads to errors, but it also limits the throughput to a great degree. Furthermore, due to the different sizes of the glass pieces, impurities are carried partially covered up through the inspection station, so that they necessarily remain undetected.

In the known methods the entire mass of shards including the undiscovered impurities are fed to a breaking apparatus, a so-called "shard breaker." In the latter any unavoidably small but otherwise suitable shards are again crushed, especially on account of the presence of larger pieces of glass. Consequently, larger amounts of energy than absolutely necessary are needed for driving the shard breaker. By means of subsequent separating stations, which may be equipped with magnetic apparatus, aspirator nozzles or the like, additional impurities composed of ferrous and nonferrous metals as well as organic substances are separated out, in which case the small glass fragments and the large total amount o glass throughput prove to be a hindrance. In particular, the power of the aspirator nozzles cannot be adjusted to an optimum level because they pick up the fine glass particles.

In addition to a high specific energy consumption, the apparatus parts needed for the known process are relatively bulky. They therefore necessitate high investment and operating costs, both for the apparatus and for the corresponding complex of buildings.

SUMMARY OF THE INVENTION

The present invention, therefore, is addressed to the problem of reducing the amount of inspection required, facilitating visual inspection, narrowing the range of shard particle sizes, and reducing the power required per unit of weight of the scrap glass throughput.

Prior to the manual sorting, and prior to crushing in the breaking apparatus, a sorting of the old glass into at least two fractions of different particle sizes is performed in a separating apparatus.

Only the old glass of the coarser fraction (coarse glass) is fed, after the segregation of at least a part of the nonglass impurities, to the breaking apparatus old glass crushed to the desired shard size is then delivered to mechanical separating apparatus for sorting out remaining metallic impurities, and finally it is delivered to a storage facility for good glass.

Therefore, in principle at least two fractions of different ranges of piece sizes are produced by a separating apparatus and processed separately from one another, but parallel to one another, in which case the piece size range of the coarser fraction, i.e., of the "coarse glass," is adapted very thoroughly in a breaking apparatus during the process to the piece size range of the finer fraction, i. e., the "fine glass". In this manner the already present finer fraction of the scrap glass is especially prevented from being subjected to another breaking process.

A considerable advantage is already achieved by the fact that the delivered old glass is divided into only two fractions of different piece sizes. The division, however, can also be into four fractions which can be defined as follows: "coarse"—"less coarse"—"less fine"—"fine". In this case it is sufficient to feed only the old glass of the coarsest fraction to the breaking apparatus.

The following advantages are associated with the invention:
  The scrap glass that was crushed uninspected during the return process remains in this state.
  The breaking apparatus to be used for the coarse glass can be operated at substantially reduced power. This considerably reduces the invested and operating costs.
  The burden on the personnel required in the inspection station is considerably lightened, since all they need to inspect is a precisely defined fractional range. In this manner an increase of efficiency can be achieved, on the one hand, and on the other hand the noise level in the inspection station is considerably reduced by locating it in a soundproof cabin.
  The floor space needed for setting up an apparatus for the method according to the invention is substantially smaller for a comparable throughput.
  The installation of air-conditioning can be limited to the "inspection room".

On account of a substantially more precisely defined shard size in each parallel branch of the process the aspirating power of the aspirator nozzle can be optimized. This means greater purity in the shard mass without appreciable losses of glass due to excessive suction. Reducing the suction power and/or shifting the exhaust fan system out of the soundproof cabin can furthermore prevent them from exhausting costly warm heating air to the outside, or can reduce such losses to a substantial degree.

The invention also concerns an apparatus for the practice for the method described above. This apparatus has, in a conventional manner, at least one continuously drivable, open conveyor system which is brought through at least one inspection station for the manual segregation of nonglass components such as ferrous and nonferrous metals as well as nonmetallic contaminants, plus a breaking apparatus for the mechanical comminution of scrap glass, and lastly, if necessary, a sorting apparatus.

To achieve substantially the same object, such an apparatus includes a separating apparatus for sorting the old glass into at least two fractions of different piece sizes precedes the conveyor apparatus with the corresponding inspection station.

The output of the separating apparatus for the coarser fraction ("coarse glass") is connected to the open conveyor system with the corresponding inspection station. The discharge end of the conveyor system is associated with the breaker apparatus, whose output opening is in turn connected to at least one mechanical separating apparatus for the segregation of remaining metallic impurities.

The output of the parallel separating apparatus for the finer fraction ("fine glass") is connected to an additional open conveyor system with corresponding inspection station. The discharge end of the additional conveyor system is connected to at least one additional mechanical separating apparatus for the segregation of remaining metallic impurities.

It is especially advantageous for a vertical elevator to run from a hopper containing the delivered old glass to the separating apparatus for the sorting of the old glass into the at least two fractions of different piece size ("coarse glass" and "fine glass") when the said separating apparatus is in the form of a multistage oscillating sieve and when the outputs of the separating apparatus are connected in parallel by chutes to the open conveyor systems situated at a lower level.

The association of the chutes with the open conveyor systems can be direct or indirect, as it will be pointed out later on.

Additional advantageous developments of the subject matter of the invention will be seen in the rest of the subordinate claims.

BRIEF DESCRIPTION OF THE DRAWINGS

FIG. 3 is a diagrammatic representation of a treatment path for the finer and finest fractions without a breaking apparatus.

DETAILED DESCRIPTION OF THE PREFERRED EMBODIMENT

Figure 1:
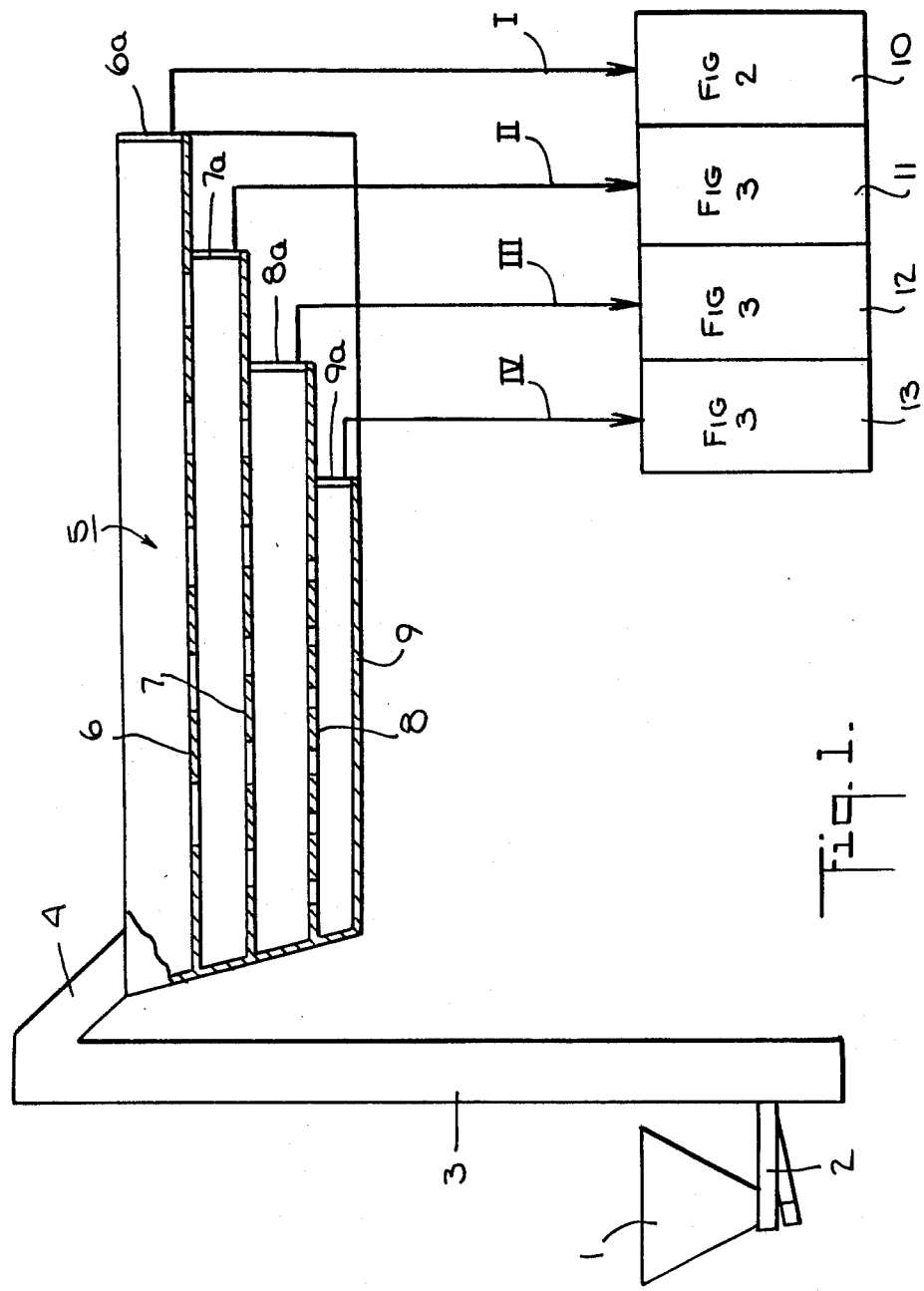
FIG. 1 is a block-diagrammatic representation of a separating apparatus for the separation of the old glass mass as delivered, into a total of four fractions, with parallel treatment paths connected to its output.

In FIG. 1 is shown a charging apparatus 1 in the form of a filling hopper 1 for the old glass as delivered, from which a feeding apparatus 2 in the form of a vibrating conveyor trough leads to a vertical conveyor 3 which is in the form, for example, of an elevator or bucket mechanism. From the vertical conveyor 3 a chute 4 leads to a separating apparatus 5 which is in the form of a multistage vibrating sieve. For this purpose the separating apparatus 5 has three sieve bottoms 6, 7 and 8 as well as a closed bottom 9. The entire system is set in vibration in a known manner by a conventional shaker drive, so that the old glass which enters in bulk form migrates continually from the area of the chute 4 toward the right to the discharge ends 6a, 7a, 8a, of the respective sieve bottoms 6, 7, 8. The closed bottom 9 also has a discharge end 9a. The individual sieve bottoms have openings, not further identified, whose cross section diminishes from top to bottom, i.e., from sieve bottom 6 to sieve bottom 8. Thus a total of four fractions I, II, III and IV of different shard sizes are produced, which pass downwardly over the discharge ends and are guided parallel and simultaneously to the treatment paths 10, 11, 12 and 13, details of which will be explained in FIGS. 2 and 3.

The cross sections of the openings in the individual sieve bottoms are established according to the details of the application. In the case of smaller plants with correspondingly small outputs, it may be desirable to provide only the treatment paths I and II, so that a closed bottom takes the place of the sieve bottom 7.

Figure 2:
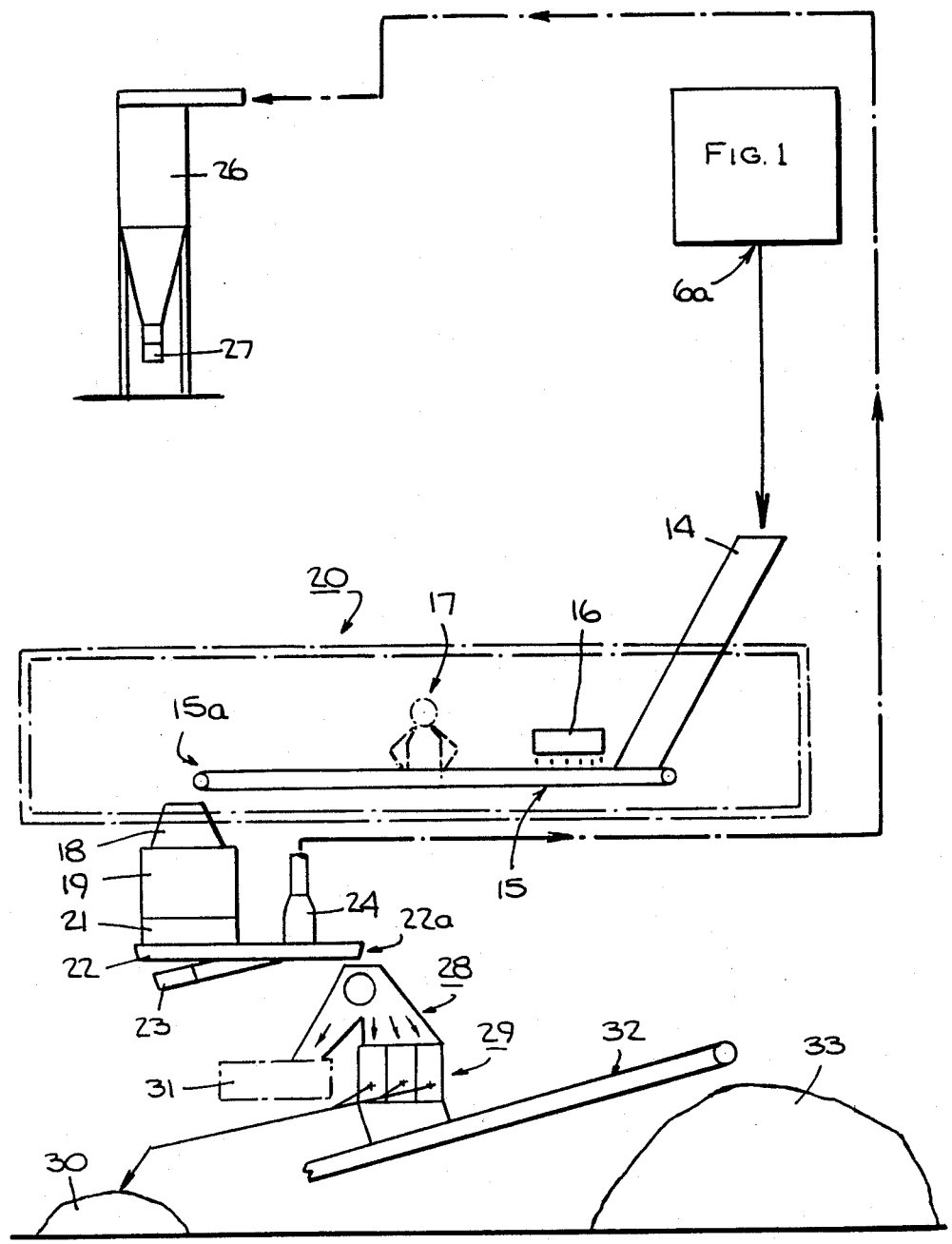
FIG. 2 is a diagrammatic representation of a treatment path for the coarser and coarsest fractions with a breaking apparatus.

FIG. 2 represents in detail the treatment path 10 from FIG. 1. From the discharge end 6a the coarsest fraction I of the old glass first runs onto a chute 14 and from there onto an open conveyor system 15 which is in the form of a flat conveyor belt. The conveyor system 15 runs under a magnetic separator 16 by which pieces of ferromagnetic materials are removed from the shard mass. After that the conveyor system 15 runs through an inspection station 17 which here is symbolized by an inspecting person 17. This inspector removes ceramic pieces, wood, or other large foreign pieces, for example, and in some cases also sorts out different-colored glass. The conveyor system 15 has a discharge end 15a which is situated above the loading opening 18 of a breaking apparatus 19. The surroundings of the conveyor, system 15 and of the corresponding inspection station 17 form what is called a "reading room" 20.

The breaking apparatus 19 furthermore has a discharge opening 21 which is associated with a conveyor chute 22 with a vibratory drive 23. By this drive the pre-cleaned and now broken glass is transported toward the output end 22a. On this path there is an aspirator nozzle 24 which is connected by an air hose 25 to a separator 26 which is in the form of a centrifugal air separator and has an air lock 27 to permit the aspirated material to be removed.

The discharge end 22a of the chute 22 is associated with an additional magnetic separator 28 and an additional separating station 29 in which the mass of shards coming from the magnetic separator 28 is freed of remaining metals which are fed to a metal dump 30. These residual metals can be both ferrous and nonferrous metals which have not previously been caught. The corresponding separating station 29 is, of itself, state of the art. Their individual chambers actually run perpendicular to the plane of the drawing. The ferromagnetic pieces drawn by the magnetic separator 28 from the stream of shards are fed to a collecting container 31. An additional conveyor system 32 runs from the separating station 29 to a dump 33 for good glass, i.e., for glass which is suitable for the melting process.

The aspirator nozzle 24 is adjustable in height above the chute 22 in order to optimize the effect of the suction.

In FIG. 3 it is shown that the exit from the separating apparatus 5 and its discharge end 7a cooperate with a transfer chute 34 which is connected to a conveyor trough 35 which is likewise equipped with the vibrating conveyor drive 36. The shards are thereby conveyed from the transfer chute 34 to the discharge end 35a of the conveyor trough 35. On this run there is an aspirator nozzle 37 whose operation and adjustability of height are similar to those of aspirator nozzle 24 in FIG. 2. The aspirator nozzle 37 is connected by a suction tube 38 to a separator 39 which is also in the form of a centrifugal air separator and has an air lock 40 for the removal of the aspirated impurities.

The discharge end 35a cooperates with an additional magnetic separator 41 whereby ferromagnetic particles are removed from the shards and delivered to a collecting container 42. The magnetic separator 41 has an additional outlet 43 for the stream of fine glass shards, which cooperates with an open conveyor system 44 which is likewise in the form of a level conveyor belt. The upper run of the belt leads from the outlet 43 past an inspection station 45, which here again is symbolized by an "inspector" figure, to a discharge end 44a.

The discharge end 44a of this conveyor system is associated with an additional conveyor trough 46 which has a vibratory driver 47. The conveyor trough 46 likewise has a discharge end 46a which has a dividing system which divides the stream of shards uniformly into individual streams so that the shard stream is carried with an even distribution to the chambers of a separating station 48 in which any remaining metals are withdrawn from the stream and then fed to a metal dump 49. The individual chambers of the separating station 48 are here again actually arranged in a row perpendicular to the plane of drawing. From the separating station 48 an additional conveyor system 50 in the form of a conveyor belt again runs to a dump 51 for additional good glass. The functions of similar components in FIGS. 2 and 3 are very largely identical.

The treatment paths III and IV have substantially the same construction as treatment path II according to FIG. 3. The final treatment path for the finest fraction of the particle size—treatment path IV in the present case—can be simplified if desired. It is possible to construct the very fine shard run without additional separating stations and/or manual sort-out, i.e., without an open conveyor system and thus without an inspection station. Alternatively, just only one of the above-described separating operation can be performed, i.e., either a magnetic separator only, a manual sort-out only, only one separator, or only one nonferrous metal separating station, can be provided. For if the final and therefore very fine fraction falls below a particular particle size, it can be assumed that the impurities or foreign matter that can be trapped out in the separating stations in question have a decidedly larger particle size, so that they have already been held back with the next coarser fraction or have been separated in the treatment path in question.

The separators 26 and 39 do not have to be separate units; they can also be replaced by a single separator.

I claim:

1. A method for the recovery of glass from old glass comprising:

sorting the old glass into at least one coarse fraction and at least one fine fraction in a separating apparatus;

segregating at least a portion of nonglass impurities of the coarser fraction;

feeding the remaining coarser fraction to a crushing apparatus;

crushing the coarser fraction to a desired shard size range;

feeding the crushed shard to at least one mechanical separating apparatus for the segregation of remaining metallic impurities;

transferring the segregated crushed shard to a dump for good glass;

segregating at least a portion of nonglass impurities of the fine fraction, and without further crushing, segregating residual metallic impurities of the fine fraction; and transferring the remaining fine fraction to a dump for good glass.

2. The method of claim 1 wherein only the old glass of the coarsest fraction is crushed.

3. The method of claim 1 wherein the old glass of the least one coarse fraction moves during continuous transport on an open conveyor system underneath a magnetic separator and through a visual inspection station.

4. The method of claim 3 wherein the coarse fraction is then fed to the crushing apparatus, and the crushed old glass is fed to a vacuum separating station.

5. The method of claim 4 wherein the glass is fed to an additional magnetic separator.

6. The method of claim 5 wherein the glass is also fed to at least one separating station for residual metals, and finally to the dump for good glass.

7. The method of claim 1 wherein the old glass of the at least one fine fraction is fed to a vacuum separating station, a magnetic separator, and then during continuous transport on an open conveyor system through a visual inspection station.

8. The method of claim 7 wherein the fine fraction is then again fed to at least one separating station for residual metals, and finally to the dump for good glass.

9. The method of claim 1 wherein the sorting into the least one coarse glass and least one fine glass fractions is performed by means of a graded vibrating sieve.

10. The method of claim 9 wherein old glass is delivered to the sieve by an elevator conveyor from which the sorted fractions are advanced by means of transfer chutes onto the open conveyor systems lying at a level below.

11. Apparatus for the recovery of glass from old glass comprising:

a separating means for sorting the old glass into at least one coarse fraction and at least one fine fraction;

at least one continuously drivable open conveyor system;

at least one inspection station for the manual sorting out of nonglass components, with mechanical separating stations for nonglass impurities such as ferrous and nonferrous metals and for nonmetallic contaminants through which the open conveyor system passes, the separating means being placed before the least one conveyor system;

a crushing apparatus for the mechanical comminution of old glass and a sorting apparatus wherein the exit from the separating means for the at least one coarser fraction is connected to the open conveyor system with corresponding inspection station and the discharge end of the conveyor system is associated with the crushing apparatus whose discharge opening is in turn connected to at least one mechanical separating apparatus for the segregation of residual metallic impurities, and in parallel thereto the exit from the separating means for the at least one fine fraction is connected to an additional open conveyor system with corresponding inspection station, and the discharge end of the additional conveyor system is connected to at least one additional mechanical separating station for the segregation of remaining metallic impurities.

12. The apparatus of claim 11 wherein the open conveyor system for the at least one coarse fraction runs underneath a magnetic separator and then through the inspection station.

13. The apparatus of claim 12 wherein the exit opening of the breaking apparatus is associated with a conveyor trough above which an aspirator nozzle connected to a separator is situated, and the discharge end of the conveyor trough is associated with an additional magnetic separator and at least one additional separating station for residual metals, from which an additional conveyor system runs to a dump for good glass.

14. The apparatus of claim 11 wherein the output of the separating means for the at least one finer fraction is connected through a transfer chute first to a conveyor trough above which an aspirator nozzle connected to an additional magnetic separator whose one outlet for the "fine glass" is connected to the open conveyor system with corresponding inspection station.

15. The apparatus of claim 14 wherein the discharge end of the conveyor system is associated with an additional conveyor trough whose discharge end is in communication with an additional separating station for residual metals, from which another additional conveyor system runs to a dump for good glass.

16. The apparatus of claim 11 wherein from a supply container for the old glass an elevator runs to the separating means for sorting the old glass into the at least two fractions of different piece size.

17. The apparatus of claim 16 wherein the said separating means is a multi-stage vibrating screen.

18. The apparatus of claim 17 wherein the outlets from the separating means are connected in parallel through transfer chutes to the open conveyor apparatus lying at a lower level.

* * * * *